(12) United States Patent
Moss

(10) Patent No.: US 6,907,491 B2
(45) Date of Patent: Jun. 14, 2005

(54) METHODS AND STRUCTURE FOR STATE PRESERVATION TO IMPROVE FAIRNESS IN BUS ARBITRATION

(75) Inventor: Robert W. Moss, Longmont, CO (US)

(73) Assignee: LSI Logic Corporation, Milpitas, CA (US)

(*) Notice: Subject to any disclaimer, the term of this patent is extended or adjusted under 35 U.S.C. 154(b) by 412 days.

(21) Appl. No.: 10/164,240

(22) Filed: Jun. 5, 2002

(65) Prior Publication Data

US 2003/0229742 A1 Dec. 11, 2003

(51) Int. Cl.[7] .......................... G06F 13/36; G06F 12/00
(52) U.S. Cl. ...................................... 710/309; 710/240
(58) Field of Search .............................. 710/240–244, 710/260–264, 113, 309

(56) References Cited

U.S. PATENT DOCUMENTS 6,606,676 B1 * 8/2003 Deshpande et al. ......... 710/262
6,738,845 B1 * 5/2004 Hadwiger et al. ........... 710/240
2004/0103231 A1 * 5/2004 Zhu ............................. 710/113

* cited by examiner

Primary Examiner—Tim Vo

(57) ABSTRACT

Methods and structure for enhanced bus arbitration providing a hybrid arbitration technique combining priority-based arbitration with round-robin arbitration within a priority level with improved fairness for all devices participating the a round-robin arbitration at a particular priority level. In particular, the invention provides a state retention technique and structure such that the present state of round-robin arbitration at each priority level is saved and restored when a higher priority master device interrupts the round-robin arbitration at a lower level. The restoration of saved state information allows the round-robin arbitration at a lower priority to resume at the saved state to thereby improve fairness of arbitration among devices at a given priority level.

13 Claims, 3 Drawing Sheets

METHODS AND STRUCTURE FOR STATE PRESERVATION TO IMPROVE FAIRNESS IN BUS ARBITRATION

RELATED PATENTS

This patent is related to co-pending, commonly owned U.S. patent application Ser. No. 10/162,960, filed (concurrently herewith), entitled METHODS AND STRUCTURE FOR IMPROVED FAIRNESS BUS ARBITRATION and is related to co-pending, commonly owned U.S. patent application Ser. No. 10/164,332, filed (concurrently herewith), entitled METHODS AND STRUCTURE FOR DYNAMIC MODIFICATIONS TO ARBITRATION FOR A SHARED RESOURCE, both of which are hereby incorporated herein by reference.

BACKGROUND OF THE INVENTION

1. Field of the Invention

The present inventions relates to bus arbitration and in particular to a bus arbitration method and structure for improving fairness in priority-based allocation of a shared bus among multiple requesting master devices.

2. Discussion of Related Art

It is generally known in electronic systems to have multiple devices communicating over a shared electronic bus. In general, a first device (usually referred to as a master device) initiates an exchange of information with a second device (usually referred to as a slave device). It is also generally known in the art that a bus structure may permit multiple master devices and multiple slave devices to exchange information. Generally, one master device communicates with one or more slave devices to the exclusion of other master and slave devices in the system. In such a circumstance, a first master device desiring use of the bus for communication with a slave device must first obtain temporary exclusive control over the shared bus structure. A master device obtains temporary exclusive control of the shared bus by requesting the bus structure and awaiting an acknowledgment signal indicative of granting of the requested temporary exclusive access to the shared bus.

Typically, an arbiter device coupled to the shared bus structure receives a request for temporary exclusive control of the bus from each of several master devices and selects the next master device to obtain the requested temporary exclusive control. The arbiter receives request signals and returns grant (acknowledgment) signals to master devices to indicate request and granting of temporary exclusive control, respectively. This process is typically referred to as the bus arbitration. A number of well-known commercially applied bus structures support such multiple master devices sharing control of a bus. Though the specific timing and signals involved in arbitration may vary, all such buses support arbitration in some form.

It is common in the art for an arbiter device to utilize any of several well-known techniques for determining the next requesting master device to be granted temporary exclusive control of the shared bus structure. One simple technique is often referred to as "round-robin" in that each device may be granted temporary exclusive control of the shared bus in sequential order defined by an index number—usually a master device ID. When the last master device ID is granted temporary exclusive control over the bus, the first master device is again eligible for exclusive bus control. This sequential "round-robin" technique assures that each master device has a roughly equal opportunity to obtain temporary exclusive control of the shared bus structure.

Another common bus arbitration technique is to assign a priority to each master device. At any given point, a master device with the highest priority requesting temporary exclusive control of the shared bus will be granted control over the bus. Still other techniques combine features of both a priority-based scheme and round-robin arbitration techniques. For example, each master device may be assigned a priority and all master devices having the same particular priority level share the bus using a round-robin technique.

Strict round-robins arbitration generally provides equal access to the shared bus for all master devices. Standard priority-based bus arbitration algorithms are effective at assuring that the highest priority master devices can rapidly access the shared bus as compared to lower priority devices. However a problem with priority-based scheme is that the lowest priority devices may be effectively "starved" from access to the bus due to high frequency bus requests by higher priority master devices. By contrast, round-robin arbitration techniques preclude high priority master devices from obtaining necessary frequent access to a shared bus.

Hybrid techniques, as noted above, that combine features of both round-robin arbitration and priority-based arbitration still produce unfair results in some circumstances. For example, presume a plurality of master devices are requesting the bus all at the same first priority level (i.e., applying round-robin techniques within that priority level). A higher priority master device then requests and is granted the bus (since it is a higher priority than the plurality of devices at the first priority level). When the higher priority device relinquishes the bus, the plurality of devices at the first priority level again arbitrate using round-robin techniques. However, present techniques restart the round-robin selection process in the arbitration. Thus round-robin arbitration within a priority level is not assured to fairly allocate the bus to all devices within that priority level when arbitration is interrupted by a higher priority master device request.

It is evident from the above discussion that a need exists for improved arbitration techniques that provide additional fairness to lower priority master devices while granting frequent access to high priority master devices.

SUMMARY OF THE INVENTION

The present invention solves the above and other problems, thereby advancing the state of the useful arts, by providing a hybrid arbitration technique combining priority-based techniques among all devices with round-robin techniques including state information within a priority level to improve fairness for periodic allocation of the shared bus to master devices. More specifically, the present invention retains state information regarding round-robin arbitration within a priority level when a higher priority master device interrupts the round-robin technique. When the higher priority master device relinquishes the bus, methods and structure of the present invention uses the saved state information in resuming the round-robin arbitration at the lower priority level.

A first feature of the invention therefore provides a method in a system having multiple master devices coupled to a shared bus, the bus arbitration method comprising the steps of: saving state information regarding round-robin arbitration among master devices all having a first priority level; interrupting round-robin arbitration when a master device having a higher priority level requests the shared bus; and resuming round-robin arbitration among the master devices at the first priority level using the state information.

Another aspect of the invention further provides that the step of saving comprises the step of: registering a nearest master device ID corresponding to the next master device requesting the shared bus at the first priority level.

Another aspect of the invention further provides that the step of resuming comprises the step of: granting the shared bus to the next master device identified by the nearest master device ID.

Another aspect of the invention further provides that the step of saving comprises the step of: saving an index indicative of the next master device requesting the shared bus at the first priority level.

Another aspect of the invention further provides that the step of resuming comprises the step of: granting the shared bus to the next master device identified by the nearest master device ID.

A second feature of the invention provides a bus arbitration circuit comprising: a plurality of round-robin arbitration selection elements for selecting a next requesting master device among a plurality of master devices coupled to each round-robin arbitration selection element such that each round-robin arbitration selection element includes: a state memory indicating the last master device selected by the selection element; and a nearest function element coupled to the state memory for determining the next requesting master device as a function of the last master device; and a priority arbitration selection element coupled to the plurality of round-robin arbitration selection elements for selecting the highest priority master device among the selected requesting master devices selected by each of the plurality of round-robin arbitration selection elements.

DETAILED DESCRIPTION OF THE PREFERRED EMBODIMENTS

Figure 1:
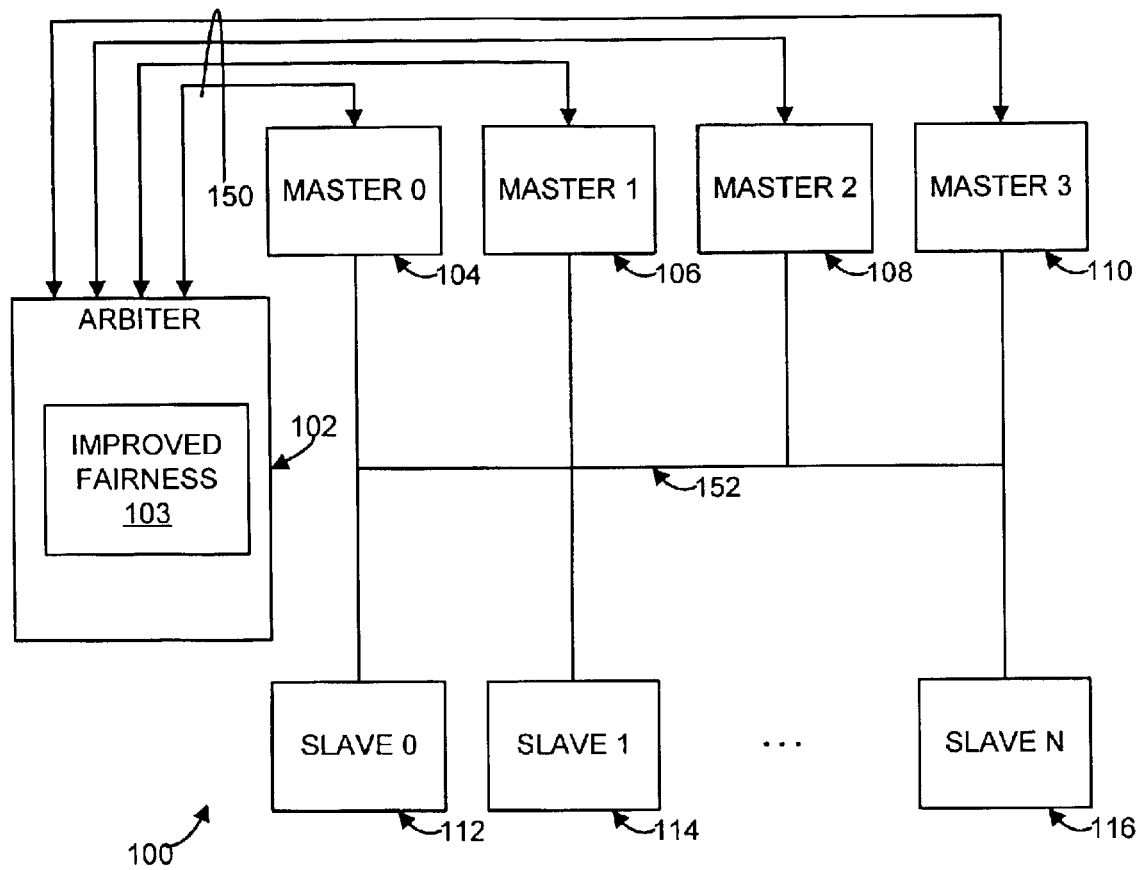
FIG. 1 is a block diagram of a typical system employing the enhanced arbitration features of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system 100 having multiple master devices 104 through 110 and multiple slave devices 112 through 116 coupled to a shared system bus 152. Arbiter 102 includes fairness improvement element 103 in accordance with the present invention to improve fairness of granting of temporary exclusive ownership of the common share bus 152 to any of multiple masters 104 through 110.

Request and grant signals associated with each master device 104 through 110 are exchanged with arbiter 102 via bus 150. In general, each master device 104 through 110 requests temporary exclusive control of bus 152 by applying a bus request signal to its associated signal path of bus 150. The arbiter 102 receives all such bus request signals from all master devices 104 through 110 and selects the next master device presently requesting temporary exclusive ownership of bus 152 to which the requested ownership will be granted. A grant signal is applied to an associated signal path of bus 150 to grant the request of the next selected master device.

As noted above, any of several well-known arbitration techniques may be used within arbiter 102 including, for example, round-robin arbitration whereby each master device 104 through 110 receives essentially equal opportunity for allocation of temporary exclusive ownership of bus 152. In addition, where particular master devices perform more critical operations, priority-based arbitration schemes are common within arbiter 102. In a priority-based arbitration architecture, each master devices is associated with a particular priority level. When multiple master devices simultaneously request temporary ownership of bus 152, arbiter 102 selects the highest priority such requesting master device to receive the requested temporary exclusive ownership of bus 152. At any given priority level, multiple master devices having the same priority level may be granted temporary exclusive ownership by application of a round-robin arbitration schemes within the priority level.

As noted above, in such hybrid arbitration architecture, lower priority master devices may be unfairly (inequitably) granted temporary exclusive ownership of the shared bus relative to other devices at the same priority level. Specifically, when round-robin arbitration at a lower priority level resumes after interruption by a higher priority device, starting over in the round-robin sequence can result in unfair allocation of the shared bus among the master devices at the lower priority level.

Fairness improvement element 103 within arbiter 102 provides improved fairness in bus arbitration when used in conjunction with priority-based arbitration architectures. In general, as noted above, fairness improvement element 103 ensures that all master devices at the same priority level will receive fair allocation to the shared bus in a round-robin fashion regardless of interruption of the round-robin sequence by a higher priority master device.

More specifically, fairness improvement element 103 preferably saves state information regarding the round-robin arbitration process within each priority level. When the round-robin sequence is interrupted by a higher priority master device, the state information is used to resume the round-robin sequence at the lower priority to thereby ensure fair access to the shared bus for all master devices within a priority level.

Those skilled in the art will recognize that the architecture depicted in FIG. 1 is intended as exemplary of a wide variety of bus architectures that may benefit from the improved fairness techniques and structure of the present invention. In particular, those skilled in the art will recognize that any number of master devices may be used in conjunction with such a system structure limited only by the specifications of the particular system bus selected by the designer. Further, any number of slave devices, limited only by the requirements and specifications of the selected system bus, may be present in such a system 100.

Still further, those of ordinary skill in the art will recognize that any of several well-known system bus architectures may be selected for a system bus 152 and arbitration signals on bus 150. In particular, in one exemplary preferred embodiment, bus 150 and 152 together may be an AMBA AHB compliant high-performance system bus architecture. A number of other common, commercial bus structures as well as customized proprietary bus structures may also benefit from the features of the present inventions. Those skilled in the art will further recognize that signals applied to bus 150 and system bus 152 are typically integrated in a single bus structure rather than two distinct bus structures as depicted in FIG. 1. Signals applied to bus 150 are shown in FIG. 1 as separate from system bus 152 only to simplify the description in that signals applied to bus 150 relate exclusively to bus arbitration processing to exchange signals between master devices 104 through 110 and arbiter 102.

Figure 2:
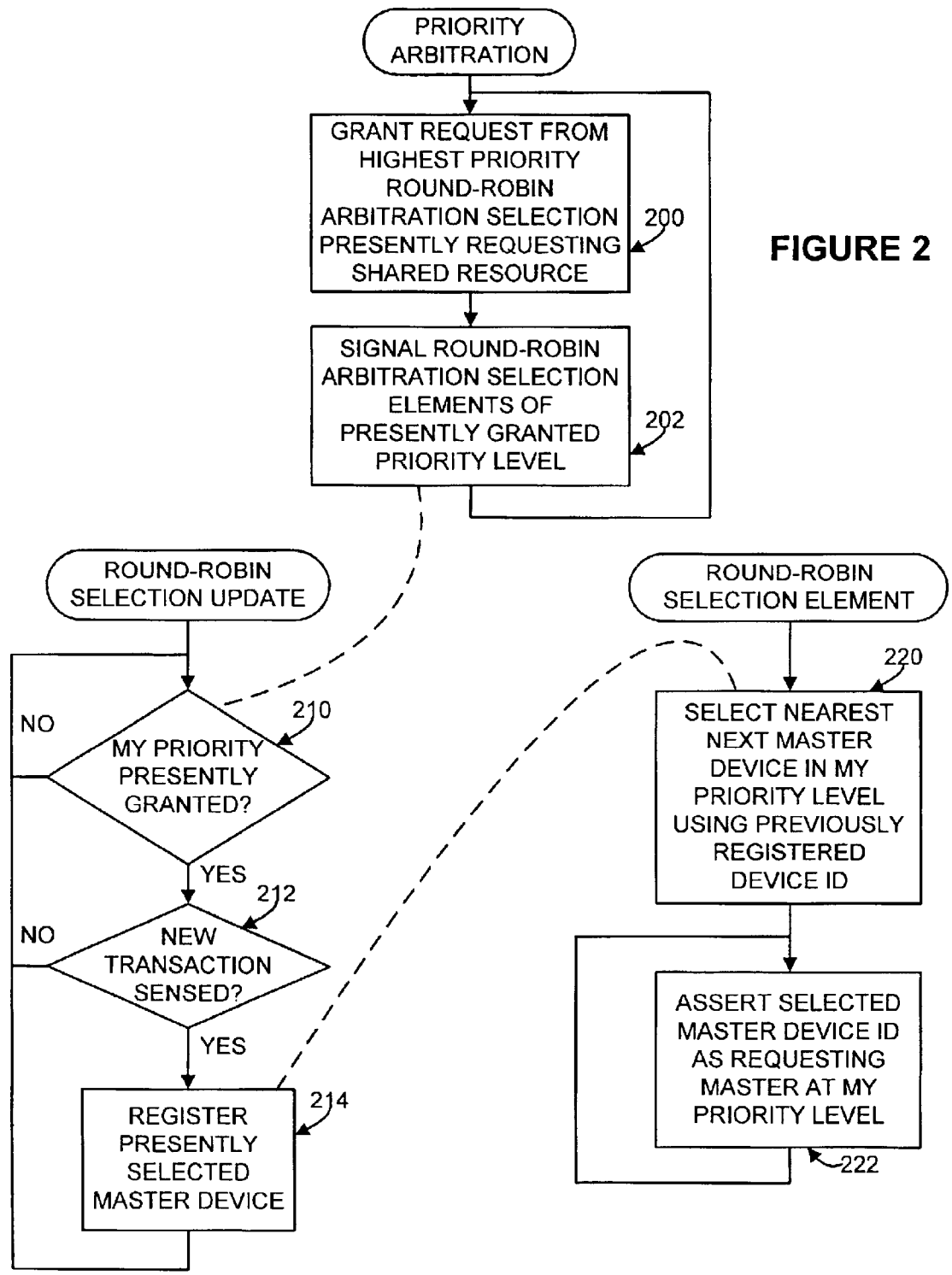
FIG. 2 is a flowchart describing an exemplary method of the present invention to improve fairness in priority-based bus arbitration.

FIG. 2 is a collection of flowcharts describing operation of an arbiter in accordance with the fairness improvements of the present convention. Elements 200 and 202 represent processing by the priority arbitration component of the arbiter. Elements 210 through 214 and 220 through 220 represent processing of a round-robin selection element of the arbiter in accordance with the present convention. As noted generally here in above, the priority selection element of the arbiter preferably selects among the outputs of a plurality of round-robin selection elements. At each priority level, a round-robin selection element preferably determines the next master device ID requesting the shared resource at that corresponding priority level. The priority arbitration selection element then selects among the various round-robin selection elements generating corresponding requests for master devices at each priority level. Those skilled in the art will recognize that priority arbitration may be performed first followed by round-robin arbitration selection or other combinations of selection criteria. Such design choices are well-known to those of ordinary skill in the art.

Element 200 is operable to grant the request for the shared resource from the highest priority round robin selection element presently requesting access to the shared resource. A new request is granted only if a higher priority master device through an associated round-robin arbitration selection element generates the request. Until such a new higher priority request is received, the present owner of the shared resource continues exclusive access to resource. If no master devices are presently accessing the shared resource, the resource remains idle. When element 202 grants a new request from one of the plurality of round-robin arbitration selection elements, element 202 is next operable to signal the round-robin arbitration selection elements interrupting their respective round-robin selection to indicate that a new transaction has been granted. Processing then continues by looping back to element 200 to await granting of yet another high-priority request for the shared resource. The dashed line connecting element 202 and element 210 indicates the interruption of normal processing by the round-robin selection elements.

Determining the relative measure of priority levels may be accomplished by simple arithmetic comparison of level number expressed as a range of numeric values. In the alternative, the priority levels may be encoded in a tabular format such that a resultant "highest" priority level is determined by table lookup. The table below describes an exemplary tabular encoding of priority levels to select a "highest" priority from the table of levels presently asserting that a master device at that level requests access to the shared resource. The table presents an exemplary encoding where two levels are defined (preferably corresponding to two round-robin selection elements—one at each of the identified levels.

| Level 2 Request Present | Level 1 Request Present | Level 2 Selected | Level 1 Selected |
|---|---|---|---|
| 0 | 0 | 0 | 0 |
| 0 | 1 | 0 | 1 |
| 1 | 0 | 1 | 0 |
| 1 | 1 | 1 | 0 |

Those of ordinary skill in the art will readily recognize that such a table may be easily adapted to any number of Priority levels. Two levels as presented is merely intended as representative of one exemplary embodiment of the invention. Further, those skilled in the art will recognize that such a table may be stored in a memory associated with the priority selection element of an arbiter in accordance with the present invention.

Elements 220 through 222 represent standard processing within each round-robin selection element to select a next (nearest) master ID at the corresponding priority level. Those of ordinary skill in the art will recognize that the process is preferably operable in parallel within multiple such round-robin selection elements. Each round-robin selection element is operable with respect to master devices coupled thereto all having the same corresponding priority level. Element 220 is first operable to identify the nearest next master device presently requesting access to the shared resource at the corresponding priority level. The previously saved (registered) requesting master ID is used in determining the nearest next master device. For example, if four master devices (A, B, C and D) have corresponding device ID's 0, 1, 2 and 3, the next nearest master device is determined as the next higher device ID requesting the shared resource relative to the device ID of the master device previously registered. Such a computation is preferably performed using modulo arithmetic to wrap from ID 3 back to ID 0. The following table is suggestive of one exemplary preferred round-robin sequence that determines the next nearest master ID given a previously registered (presently active) master device ID.

| Present ID (index_x) | Request from Device A (ID 0) | Request from Device B (ID 1) | Request from Device C (ID 2) | Request from Device D (ID 3) | Next ID (nearest_x) |
|---|---|---|---|---|---|
| 00 | n/a | 1 | n/a | n/a | 01 |
| 00 | n/a | 0 | 1 | n/a | 10 |
| 00 | n/a | 0 | 0 | 1 | 11 |
| 00 | n/a | 0 | 0 | 0 | 00 |
| 01 | n/a | n/a | 1 | n/a | 10 |
| 01 | n/a | n/a | 0 | 1 | 11 |
| 01 | 1 | n/a | 0 | 0 | 00 |
| 01 | 0 | n/a | 0 | 0 | 01 |
| 10 | n/a | n/a | n/a | 1 | 11 |
| 10 | 1 | n/a | n/a | 0 | 00 |
| 10 | 0 | 1 | n/a | 0 | 01 |
| 10 | 0 | 0 | n/a | 0 | 10 |
| 11 | 1 | n/a | n/a | n/a | 00 |
| 11 | 0 | 1 | n/a | n/a | 01 |
| 11 | 0 | 0 | 1 | n/a | 10 |
| 11 | 0 | 0 | 0 | n/a | 11 |

Those skilled in the art will readily recognize that such a table structure may be easily adapted to any number of master devices. A table indicating four such master devices is therefore merely intended as exemplary of one typical embodiment of the present convention. Further, those of ordinary skill in the art will readily recognize that the next nearest ID may be determined either by simple computation or by reference to a lookup table such as the table presented above. Such a lookup table may, for example, be stored in a memory associated with the round-robin arbitration selection element.

Referring again to FIG. 2, following selection of a next nearest master device by element 220, element 222 is operable to apply a selected master device ID as the presently requesting master device at the priority level corresponding to the round-robin arbitration selection element in which the method is presently operable. Element 222 continues to assert the selected master device as the requesting master device at the corresponding priority level until the round-robin sequence is interrupted as noted above and as indicated by the dashed line entering element 220. When so interrupted, processing of element 222 is terminated and processing jumps back to element 220 to select a next nearest master device in the round-robin sequence.

Elements 210 through 214 are operable to update the round-robin arbitration selection process in response to a signal from the priority arbitration selection element indicating a new transaction is to be selected at the priority level corresponding to the round-robin arbitration selection element in which the method is operating. Element 210 is first operable to determine whether the priority level corresponding to the round-robin selection element operating the method is the presently selected "highest" priority level. If not, processing continues looping on element 210. Element 212 is operable to check for receipt of a signal from the priority arbitration selection element indicating that a new round-robin selection sequence should be commenced. Upon receipt of such a signal, processing continues with element 214. If elements 210 and 212 thus jointly determine that a new transaction has been sensed and that the priority level corresponding to this round-robin selection process is presently granted as the highest priority level, element 214 is then operable to register (save) the presently selected master device ID and to signal the round-robin selection process element 220 that a new nearest master device ID should be selected in the round-robin process. Such a signal is indicated by the dashed line exiting element 214. Processing then continues by looping back to element 210 to await the sensing of a new transaction at the priority level associated with this round-robin arbitration selection element processing.

Those skilled in the art will recognize that the flowchart of FIG. 2 is intended as a broad functional description of methods of the present invention operable within an improved fairness arbiter. Numerous equivalent techniques will be readily apparent to those of ordinary skill in the art to provide similar fairness by improving equity of allocation of a shared resource among a plurality of master devices at the same priority level using round-robin arbitration techniques within the priority level.

Figure 3:
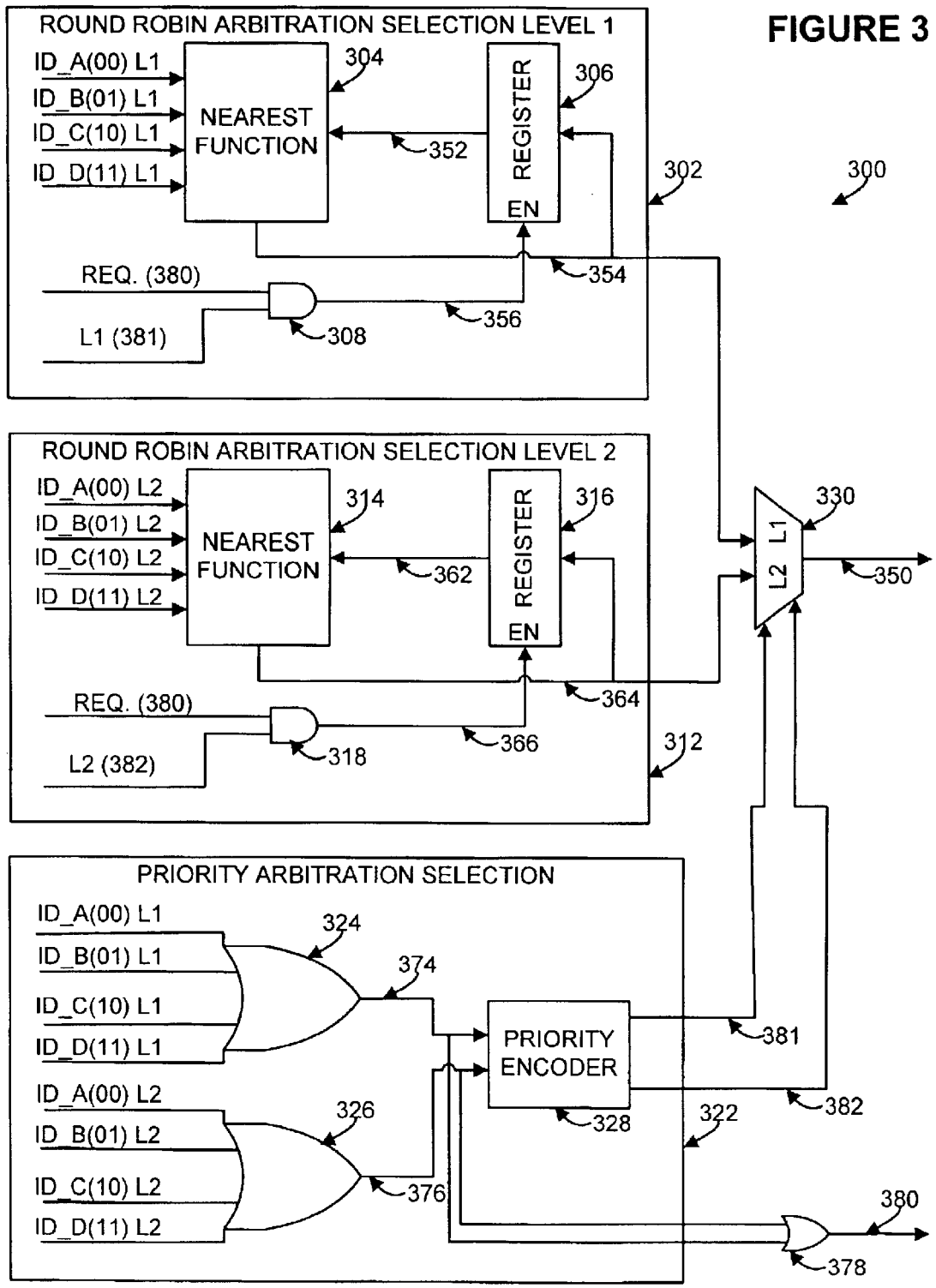
FIG. 3 is a timing diagram showing exemplary, approximate timings for an exemplary preferred embodiment of the improved fairness arbiter of the present invention.

FIG. 3 is a block diagram of a structure for implementing the improved fairness features of the present inventions. FIG. 3 depicts an arbiter structure 300 providing multiple master devices coupled to each of two round-robin arbitration selection elements 302 and 312. The output signal generated by each round-robin arbitration selection element 302 and 312 is applied to a multiplexer 330 for selection in accordance with output signals generated by a priority arbitration selection element 322.

Priority arbitration selection element 322 preferably includes an OR gate for each priority level supported by the priority arbitration selection element 322. OR gate 324 receives an input signal from each master device associated with level 1 priority of the depicted system. Likewise, OR gate 326 receives an input from each master device associated with priority level 2 of the depicted system. The input signals to each OR gate 324 and 326 indicate a request at a given priority level by the corresponding master device for access to the shared resource managed by the arbiter 300. The output signal of each OR gate indicates that at least one master device at the corresponding priority level is requesting access to the shared resource. In particular, path 374 receives the output signal of OR gate 324 indicating some device at priority level 1 is requesting access to the shared resource. In like manner, path 376 receives the output of OR gate 326 indicating that some device at priority level 2 is requesting access to the shared resource. Priority encoder 328 within priority arbitration selection 322 then receives the signals on paths 374 and 376 to generate an encoded signal for application to multiplexer 330 via paths 381 and 382. In particular, the signal on path 381 indicates that level 1 is to be selected as the present highest priority and the signal applied to path 382 indicates that level 2 is to be selected as the present highest priority.

The output signals applied to path 381 and path 382 by priority arbitration selection element 322 serve as select signals for multiplexer 330 to select the present output of round-robin arbitration selection element 302 when level 1 is the present highest priority or to select the output of round-robin arbitration selection element 312 when level 2 is the present highest priority. The input signals so selected by multiplexer 330 are, in turn, applied to output path 350 for further processing within the arbiter system.

Round-robin selection element and 312 and 302 are essentially identical in structure but operate on input signals corresponding to different requesting master devices at different priority levels. In particular, round-robin arbitration selection element 302 operates to select a next master device at priority level 1 and element 312 selects a next master device at priority level 2. Element 302 includes nearest function determination element 304 to determine the next nearest master device ID in the round-robin sequence. Nearest function element 304 receives request signals from each of the master devices coupled thereto as indicated by signal paths ID_A(00) through ID_D(11) at level 1. Nearest function element 304 also receives the present selection previously registered in register 306 and applied to nearest function element 304 via path 352. The output of nearest function element 304 is continuously applied to path 354 as an input to multiplexer 330 as discussed above and indicates the present selection at priority level 1 from the corresponding round-robin selection element 302.

The output of nearest function element 304 on path 354 is also applied to register 306 as an input value to be saved when so enabled by a signal on path 356. The signal generated on path 356 as the output of AND gate 308. AND gate 308 receives an input signal from the path 381 of the priority arbitration selection element 322 indicating that level 1 (the level corresponding to round-robin arbitration selection element 302) is presently selected as the highest priority. The second input to AND gate 308 is a signal indicating that a new transaction has been detected as indicated on the REQ. signal path 380. A new transaction or request is detected when any master device associated with the system of the present invention first asserts a new request for access to the shared resource. In one exemplary embodiment, the outputs of OR gate 324 and OR gate 326 on paths 374 and 376, respectively, are applied as inputs to OR gate 378. The ORd output signal is applied to path 380 to indicate that some master device has requested access to the shared resource at any of the priority levels. Applying this REQ signal on path 380 to the second input of AND gate 308 precludes changes in the arbitration logic except when a new transaction (request) is asserted by at least one of the master devices.

Register 306 within round-robin arbitration selection element 302 therefore serves as a memory element for storing a previous state of operation within the round-robin arbitration selection element 302. Saving such state information permits the round-robin arbitration selection element 302 to continue round-robin sequencing where it previously left off rather than restarting the round-robin sequence each time a new priority is selected or a new transaction is sensed. This aspect of the present invention enables the improved fairness in round-robin arbitration sequencing within a priority level. Those skilled in the art will readily recognize that register 306 may be implemented as any number of memory devices, including, for example, one or more "D flip-flops." Further those skilled in the art will recognize that an appropriate clock signal (not shown) is applied to such a flip-flop to synchronize the loading of a value therein with an appropriate system clock. These and other design choices in implementing the memory element 306 will be readily apparent to those of ordinary skill in the art.

Round-robin arbitration selection element 312 is identical in structure to that of element 302 but receives input signals corresponding to master devices associated with level 2 priority of the system. As above with respect to element 302, round-robin arbitration selection element 312 includes nearest function element 314 that receives request signals from a plurality of master devices associated with level 2 of the system (ID_A(00) through ID_D(11) at level 2). Nearest function element 314 also receives the previously registered (saved) master ID value from register 316. The nearest function element 314 generates its next master ID in the round-robin sequence and applies an appropriate output signal to path 364 for input to multiplexer 330 and for input to register 316. Register 316 is enabled to load a new master ID value in response to an output signal generated by AND gate 318 on path 366. AND gate 318 receives a first input signal from path 382 indicating that level 2 is the presently selected highest priority level and a second input from REQ. on path 380 indicating that a new transaction has been sensed as discussed above.

Those of ordinary skill in the art will readily recognized that the structure of FIG. 3 is intended merely as representative of one exemplary preferred embodiment of the present invention. Those of ordinary skill in the art will readily understand numerous equivalent structures. In particular, those of ordinary skill in the art will readily recognize that any number of master devices may be associated with the round-robin selection element corresponding to a particular priority level. Further, any number of priority levels may be defined in a given system and incorporated into the structure with an associated round-robin selection element coupled to the priority selection structures.

Further, those skilled in the art will recognize a variety of alternate structures for providing round-robin or other arbitration sequences. Features of the present invention provide for a state memory to enable continuing a sequence of arbitration selections within a particular priority level. This provides improved fairness by helping ensure equality in selection of requesting master devices among a plurality of devices at the same priority level.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a system having multiple master devices coupled to a shared bus, a bus arbitration method comprising the steps of:

saving state information regarding round-robin arbitration among master devices all having a first priority level;

interrupting round-robin arbitration when a master device having a higher priority level requests said shared bus; and resuming round-robin arbitration among said master devices at said first priority level using said state information.

2. The method of claim 1 wherein the step of saving comprises the step of:

registering a nearest master device ID corresponding to the next master device requesting said shared bus at said first priority level.

3. The method of claim 1 wherein the step of saving comprises the step of:

saving an index indicative of the next master device requesting said shared bus at said first priority level.

4. The method of claim 2 wherein the step of resuming comprises the step of:

granting said shared bus to the next master device identified by said nearest master device ID.

5. The method of claim 3 wherein the step of resuming comprises the step of:

granting said shared bus to the next master device identified by said nearest master device ID.

6. A bus arbitration circuit comprising:

a plurality of round-robin arbitration selection elements for selecting a next requesting master device among a plurality of master devices coupled to each round-robin arbitration selection element wherein each round-robin arbitration selection element includes:

a state memory indicating the last master device selected by said selection element; and a nearest function element coupled to said state memory for determining said next requesting master device as a function of said last master device; and a priority arbitration selection element coupled to said plurality of round-robin arbitration selection elements for selecting the highest priority master device among the selected requesting master devices selected by each of said plurality of round-robin arbitration selection elements.

7. The circuit of claim 6 wherein said state memory comprises a register.

8. The circuit of claim 6 wherein said nearest function element comprises a lookup table indexed by said last master device to locate said next requesting master device in said lookup table.

9. In a system having multiple master devices coupled to a shared bus, a bus arbitration apparatus comprising:

means for saving state information regarding round-robin arbitration among master devices all having a first priority level;

means for interrupting round-robin arbitration when a master device having a higher priority level requests said shared bus; and means for resuming round-robin arbitration among said master devices at said first priority level using said state information.

10. The system of claim 9 wherein the means for saving comprises:

means for registering a nearest master device ID corresponding to the next master device requesting said shared bus at said first priority level.

11. The system of claim 9 wherein the means for saving comprises:

means for saving an index indicative of the next master device requesting said shared bus at said first priority level.

12. The system of claim 10 wherein the means for resuming comprises:

means for granting said shared bus to the next master device identified by said nearest master device ID.

13. The method of claim 11 wherein the means for resuming comprises:

means for granting said shared bus to the next master device identified by said nearest master device ID.

* * * * *